United States Patent [19]

Nakamura et al.

[11] Patent Number: 5,561,564
[45] Date of Patent: Oct. 1, 1996

[54] LENS DRIVING APPARATUS

[75] Inventors: Tateki Nakamura, Tokyo; Hiroshi Fujiike, Kawasaki, both of Japan

[73] Assignee: Canon Kabushiki Kaisha, Tokyo, Japan

[21] Appl. No.: 389,482

[22] Filed: Feb. 16, 1995

[30] Foreign Application Priority Data

Feb. 18, 1994 [JP] Japan ..................................... 6-045168
Nov. 1, 1994 [JP] Japan ..................................... 6-294022

[51] Int. Cl.$^6$ ............................ G02B 7/02; G02B 15/14; G03B 1/18
[52] U.S. Cl. ........................... 359/825; 359/826; 359/700; 396/85; 396/144
[58] Field of Search ..................................... 359/823, 825, 359/694, 697, 699, 700, 826; 354/400, 195.1

[56] References Cited

U.S. PATENT DOCUMENTS

| | | | |
|---|---|---|---|
| 4,553,817 | 11/1985 | Ando et al. | 359/824 |
| 5,075,713 | 12/1991 | Sakata | 354/400 |
| 5,227,829 | 7/1993 | Imanari | 354/400 |
| 5,376,983 | 12/1994 | Yamazaki | 354/195.12 |

FOREIGN PATENT DOCUMENTS

| | | |
|---|---|---|
| A4104772 | 8/1991 | Germany . |
| 4-343309 | 11/1992 | Japan ..................................... 359/825 |

*Primary Examiner*—Georgia Y. Epps
*Assistant Examiner*—Ricky Mack
*Attorney, Agent, or Firm*—Fitzpatrick, Cella, Harper & Scinto

[57] ABSTRACT

A photographing apparatus includes two moving members and an intermediate member contacting both of the two moving members. The intermediate member is selectively linked and non-linked to the two moving members to change an operation resistance to the movement of the moving members.

4 Claims, 8 Drawing Sheets

LENS DRIVING APPARATUS

BACKGROUND OF THE INVENTION

1. Field of the Invention

The present invention relates to an apparatus capable of adjusting a torque of a moving portion such as an extender having a zoom lens, a focusing lens or an iris stop built therein.

2. Related Background Art

In a conventional art photographing apparatus of this type, a drive unit having a drive motor built therein is provided to conduct power-driven zooming of focusing, etc. The drive unit usually includes switching means for disconnecting an output transmission path of the drive motor so that manual operation is permitted. In such a case, in order to enhance a touch feeling of the manual operation, viscosity of grease and the like is utilized or a friction member is pressed to a manipulation ring to increase an operation torque.

However, in the conventional art, the magnitude of the operation torque is constant and the torque which is to be small for the power-driven operation is increased for the manual operation resulting in the increase of a power consumption, or the power consumption is suppressed at the sacrifice of the touch feeling in the manual operation.

It is disadvantageous and that very time consuming taken to set an operation torque which is compatible to both the power operation and the manual operation.

Even if the operation torque is set to be compatible with both operations, the operation torque desired by the photographer, objects to be photographed and photographing environments are varied. Therefore, photographers are not all satisfied.

SUMMARY OF THE INVENTION

It is the first object of the present invention to provide a lens drive apparatus which separately sets a load for manual operation and a load for electrical power operation. It is the second object of the present invention to produce a lens drive apparatus capable of changing operation torque at the time of manual operation.

DETAILED DESCRIPTION OF THE PREFERRED EMBODIMENTS

Figure 1:
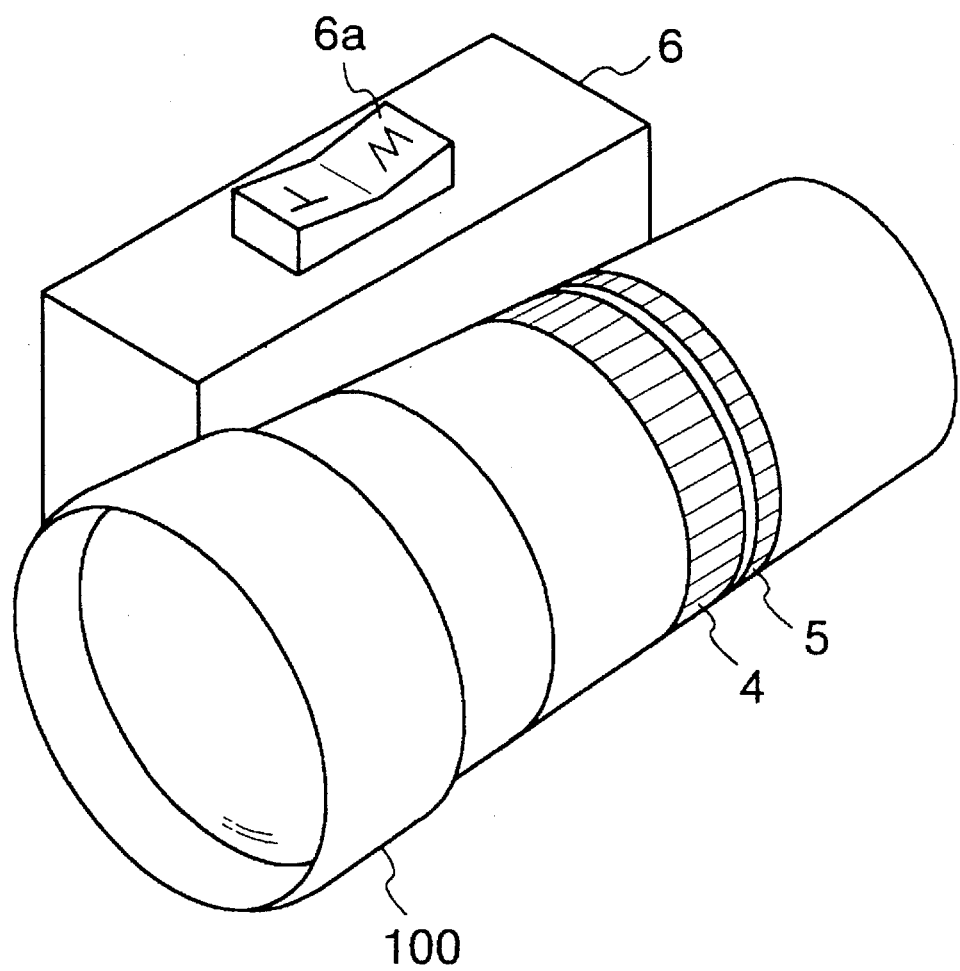
FIG. 1 shows a perspective view of a lens barrel in the present invention.

FIG. 1 shows a perspective view of a lens barrel in the present invention. Numeral 100 denotes a lens barrel and numeral 6 denotes a drive unit in which a sea-saw switch 6a for issuing a zoom command is provided. Numeral 4 denotes an operational ring for performing a zoom operation manually, which will be described later.

FIGS. 2A, 2B, 3A, 3B and 4 show constructions within the drive unit 6 of the first embodiment. A cam cylinder 2 having a cam groove 2a for driving lens array 200 along an optical axis in the zooming operation formed thereon is rotatably provided within a fixed cylinder 1 of the lens barrel. The cam cylinder drive pin 3 is fixed to the cam cylinder 2 and one end of the pin 3 is projected from a slit 1a, and an outer end of the cam cylinder drive pin 3 is fitted to a first manipulation ring 4 having a gear 4a around an outer circumference.

A linear groove 1b is formed in the fixed cylinder 1 and a pin 200a which holds the lens array 200 engages with the linear groove 1b through the cam groove 2a. Accordingly, as the cam cylinder 2 is rotated, the zoom lens array 200 is moved on the optical axis along the cam groove 2a.

A second manipulation ring 5 also having a gear 5a at an outer circumference is provided on the right side of the first manipulation ring 4 to provide overlapping therewith. A lower sliding plane 5b of the second manipulation ring 5 which slides on the fixed cylinder 1 is lubricated by low torque grease. On the other hand, an upper sliding plane 5c of the second manipulation ring 5 which slides on the first manipulation ring 4 is lubricated by high torque grease.

A drive unit housing 6 is mounted at the upper portion of the fixed cylinder 1, and lock gear 9 which is driven along only a shaft 7 having the rotation thereof regulated by a rotation regulation pin 8 is pivoted to a shaft 7 fixed in the drive unit housing 6. The gear 9a which meshes with the gear 5a of the second manipulation ring 5 is formed on an outer peripheral portion on the right side of the lock gear 9, and an intermediate gear 10 is rotatably supported on the left side of the lock gear 9.

Figure 2A:
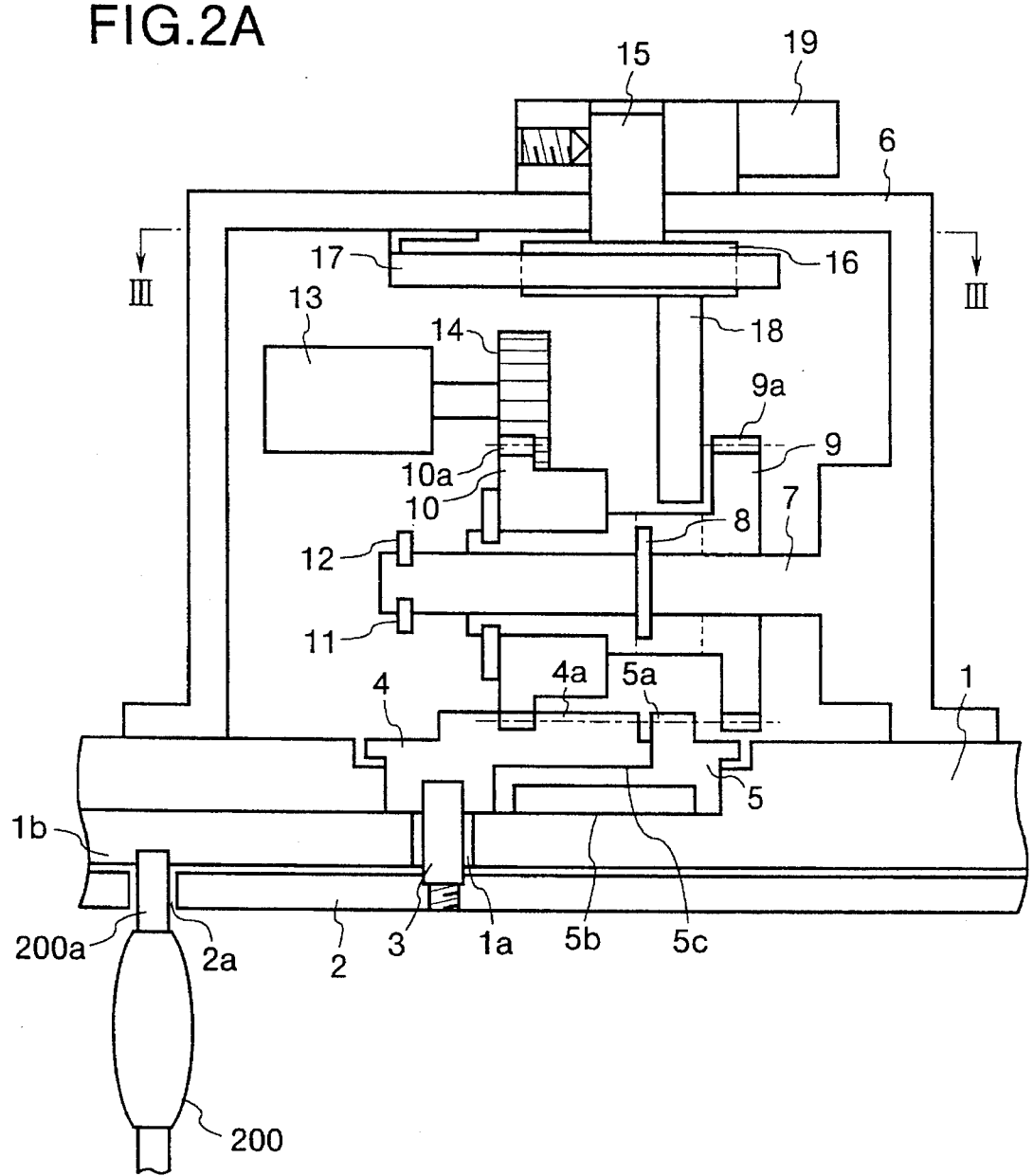
FIG. 2A shows a sectional view showing a principal portion of a lens drive apparatus of FIG. 1.
Figure 2B:
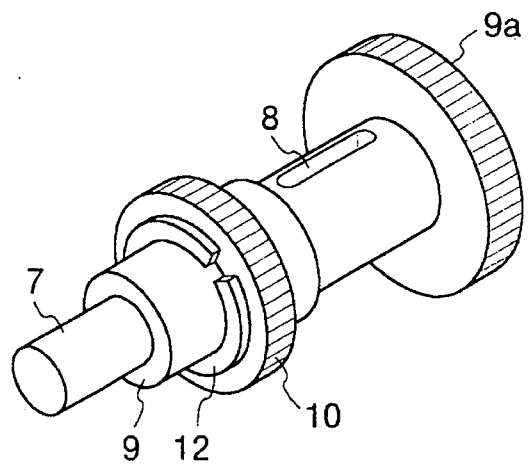
FIG. 2B shows a perspective view of a lock gear 9 in FIG. 2A, FIGS. 3A and 3B show plan views of a switching knob along a line III—III of FIG. 2A.

A perspective view of the lock gear is shown in FIG. 2B.

The gear 10a which always meshes with a gear 4a of the first manipulation ring 4 is formed on the outer peripheral portion of the intermediate gear 10. Stops 11 and 12 are respectively fixed on the left portions of the lock gear 9 and the intermediate gear 10 to prevent the removal of the lock gear 9 and the intermediate gear 10. A motor 13 fixed to the drive unit housing 6 and a gear 14 linked to the motor 13 are arranged behind the intermediate gear 10, and when the lock gear 9 is moved toward the right, the motor gear 14 meshes with the gear 10a of the intermediate gear 10.

Figure 3A:
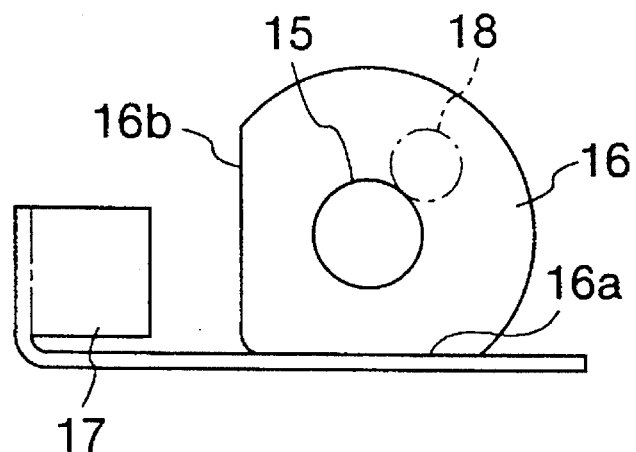
Figure 3B:
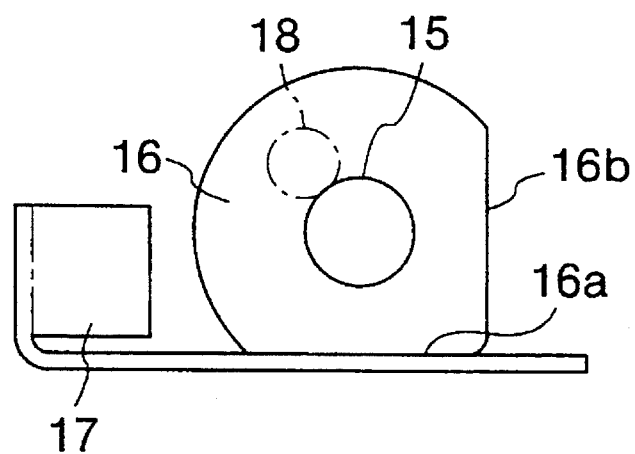

A cam shaft 15 is rotatably engaged with the upper portion of the drive unit housing 6 and a cam 16 having cam surfaces 16a and 16b shown in FIGS. 3A and 3B is fixed to the lower portion of the cam shaft 15. A leaf spring 17 for pressing any of the cam surfaces 16a and 16b is provided in front of the cam 16, and an intermediate gear drive pin 18 which is engaged between the lock gear 9 and the intermediate gear 10 is attached at an uncentered position in the bottom surface of the cam 16. A switching knob 19 to be manipulated by the photographer is provided on the upper portion of the cam shaft 15.

In the electrical power photographing mode, the photographer turns the switching knob 19 to abut the cam surface 16a of the cam 16 against the leaf spring 17 as shown in FIG. 3A to drive the intermediate gear drive pin 18 towards the right. Thus, the lock gear 9 is also driven towards the right. As a result, the meshing of the gear 9a of the lock gear 9 and the gear 5b of the second manipulation ring 5 is released and the intermediate gear 10 is driven towards the right as shown in FIGS. 2A and 2B, so that the gear 10a of the intermediate gear 10 meshes with the motor gear 14.

When the motor is energized with voltage in this state, the drive power of the motor 13 is transmitted to the first manipulation ring 4 through the motor gear 14 and the intermediate gear 10, so that the first manipulation ring 4 is rotated. Further, if the first manipulation ring 4 is rotated, the cam cylinder 2 is also rotated through the cam cylinder drive pin 3, so that the lens array is driven by electrical power.

At this time, in the second manipulation ring 5, the lower sliding plane 5b of lower torque slides on the fixed cylinder 1 and the upper sliding plane 5c of the higher torque which is the sliding plane with the first manipulation ring 4 are not slid. Thus, the second manipulation ring 5 is rotated as a body with the first manipulation ring 4, so that the lens array is driven with a low operation torque.

Figure 4:
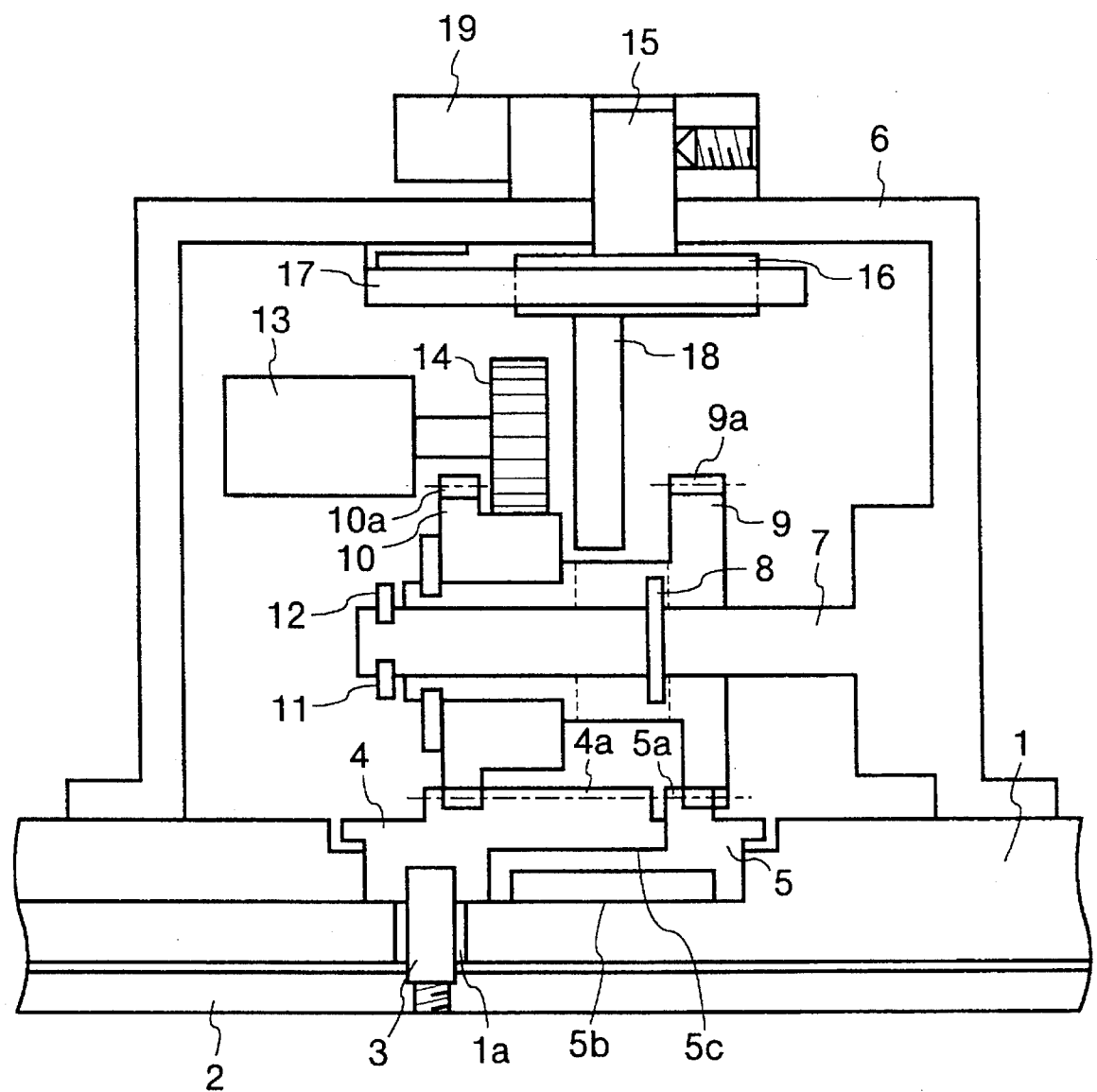
FIG. 4 shows a construction when switched to a manual operation.

In the manual photographing mode, the photographer turns the switching knob 19 in the opposite direction of that in the electrical power mode as shown in FIG. 3B to abut the cam surface 16b of the cam 16 against the leaf spring 17. Then, as shown in FIG. 4, as the intermediate gear drive pin 18 is rotated, the lock gear 9 and the intermediate gear 10 are moved as a body towards the left and while the meshing of the gear 10a of the intermediate gear 10 and the motor gear 14 is turned off, the meshing of the gear 9a of the lock gear 9 and the gear 5a of the second manipulation ring 5 is meshed, so that the rotation of the second manipulation ring 5 is limited. Under this state, when the photographer directly turns the first manipulation ring 4, the cam cylinder 2 is rotated through the cam cylinder drive pin 3 and the lens array is driven. At this time, the second manipulation ring 5 is not rotated and the first manipulation ring 4 slides on the upper surface 5c of the second manipulation ring 5 so that the lens array is driven with a high operation torque. The intermediate gear 10 is rotated around the shaft of the lock gear 9.

FIGS. 5 to 8 show constructions of a second embodiment. A cam cylinder 22 for driving zoom lens array along an optical axis is rotatably mounted within a fixed cylinder 21 of a lens barrel as it is in FIGS. 2A and 2B. The cam cylinder drive pin 23 is fixed to the cam cylinder 21 and one end of the pin 23 is projected from a slit 21a, and an outer end of the cam cylinder drive pin 23 is fitted to a first manipulation ring 24 having a gear 24a. A second manipulation ring 25 having a gear 25a on an outer circumference portion is supported by a retainer ring 26 on the right side of the first manipulation ring 24. A lower surface 24b of the first manipulation ring 24 which slides on the fixed cylinder 21 is lubricated by low torque grease, and a lower surface 25b of the second manipulation ring 25 is lubricated by high torque grease.

A drive unit housing 27 is attached to the upper portion of the fixed cylinder 21 and an intermediate gear 29 is pivoted to a shaft 28 fixed to the drive unit housing 27. The intermediate gear 29 is moveable and rotatable along the shaft 28 and gears 29a and 29b are formed at the right and the left sides of the intermediate gear 29, respectively, and an engaging groove 29c is formed between the gears 29a and 29b. Further, a stop 30 for preventing the removal of the intermediate gear 29 from the shaft 28 is attached to the left end of the shaft 28. A motor 31 fixed to the drive unit housing 27 and a motor gear 32 linked to the motor 31 are arranged behind the intermediate gear 29, and when the intermediate gear 29 is moved to the left, the motor gear 32 meshes with the gear 29b.

Figure 6:
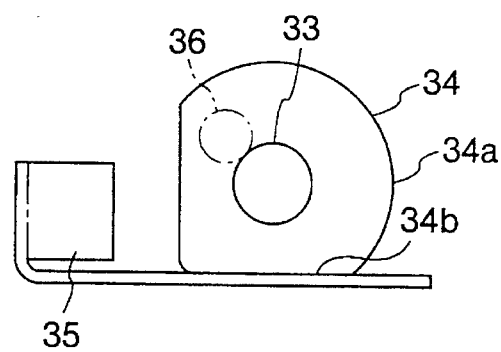
FIG. 6 shows a plan view of a switching knob along a line VI—VI of FIG. 5.

A cam shaft 33 is rotatably engaged with the upper portion of the drive unit housing 27, and a cam 34 having cam surfaces 34a and 34b as shown in FIG. 6 is fixed to the lower portion of the cam shaft 33. A leaf spring 35 for pressing any of the cam surfaces 34a and 34b is provided in front of the cam 34, and an intermediate gear drive pin 36 which engages with an engaging groove 29c of the intermediate gear 29 is attached at an uncentered position in the bottom surface of the cam 34. Further, a switching knob 37 to be manipulated by the photographer is provided above the cam shaft 33.

Figure 5:
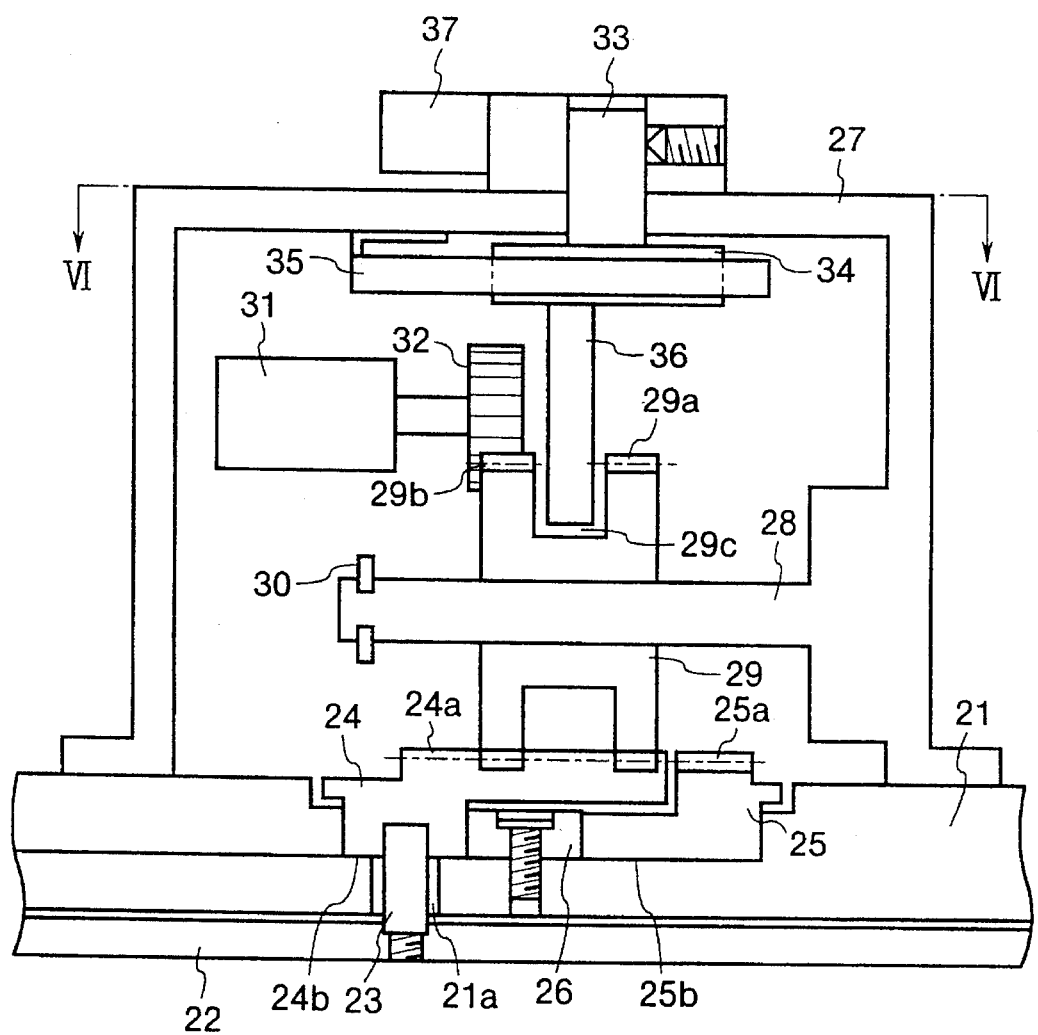
FIG. 5 shows a construction of a second embodiment.

In the electrical power photographing mode, the photographer turns the switching knob 37 to abut the cam surface 34b against the leaf spring 35 so that the intermediate gear drive pin 36 is driven towards the left as shown in FIG. 5 and the intermediate gear 29 is also driven towards the left. As a result, the meshing of the gear 29a of the intermediate gear 29 and the gear 25a of the second manipulation ring 25 is released. As a result, the gears 29a and 29b are meshed with the gear 24a of the first manipulation ring 24 and the gear 29b of the intermediate gear 29 is meshed with the motor gear 32.

Under this state, when the motor 31 is energized with voltage, the drive power of the motor 31 is transmitted to the first manipulation ring 24 by way of intermediate gear 29, so that the first manipulation ring 24 is rotated. Further, as the first manipulation ring 24 is rotated, the cam cylinder 22 is also rotated by way of the cam cylinder drive pin 23 so that the lenses are driven by electrical power. At this time, the second manipulation ring 25 is not rotated and only the first manipulation ring 24 is rotated and only the lower surface 24b of the first manipulation ring 24 having the low torque grease slides on the fixed cylinder 21, so that the lens array can be driven with the low operation torque.

Figure 7:
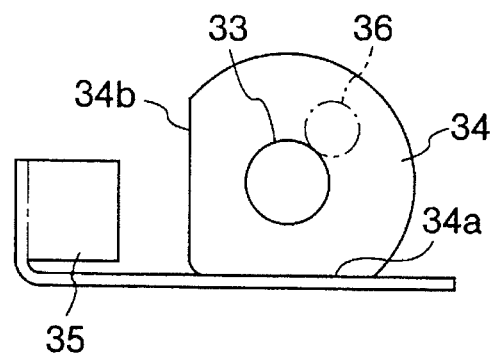
FIG. 7 shows a plan view of the switching knob when switched to manual operation.
Figure 8:
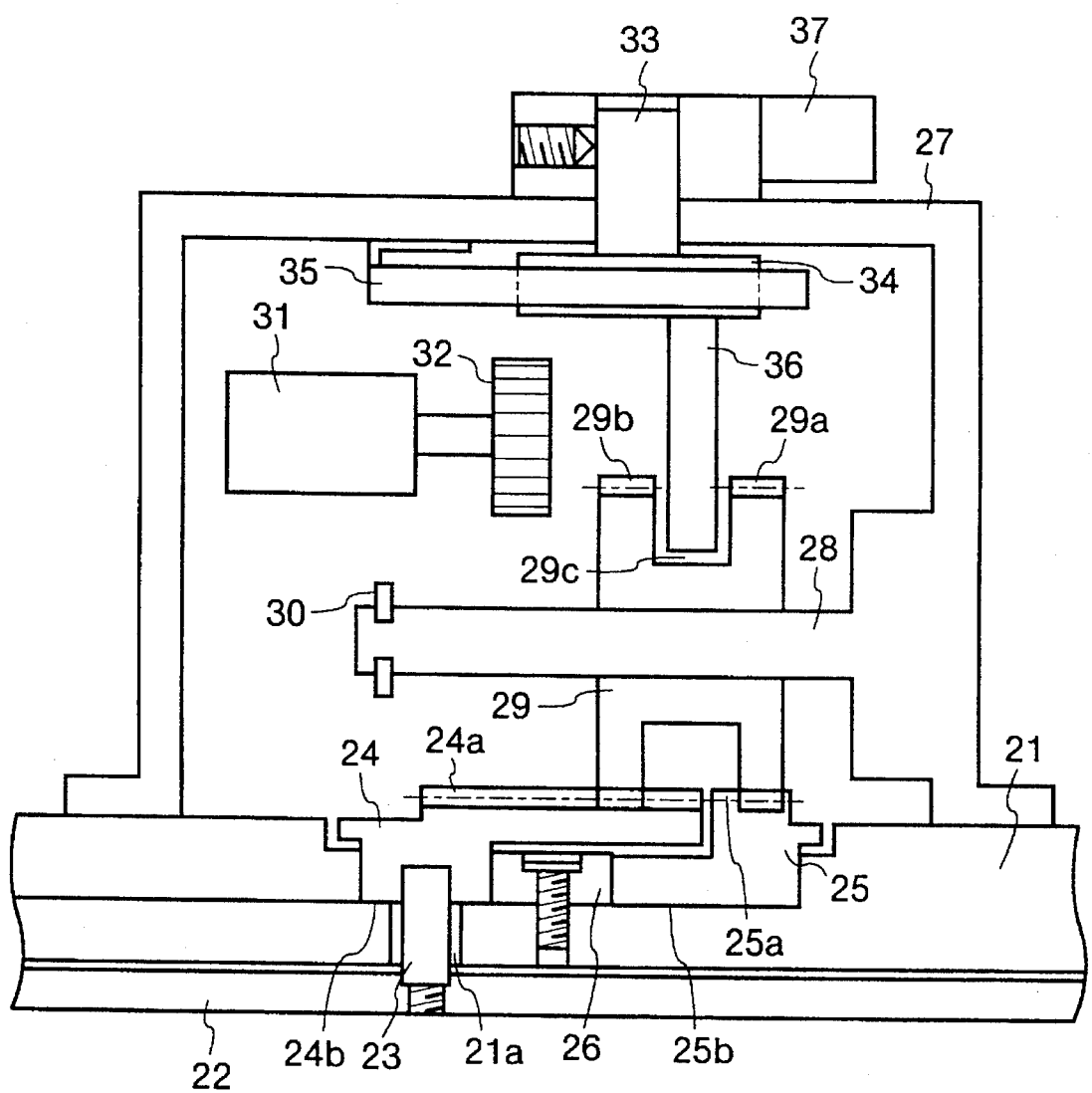
FIG. 8 shows a construction when switched to manual operation.

In the manual photographing mode, the photographer turns the switching knob in the opposite direction of that in the electrical power drive mode as shown in FIG. 7 to abut the cam surface 34a of the cam 34. Thus, as shown in FIG. 8, as the intermediate gear drive pin 36 is rotated, it is moved to the right of the intermediate gear 29. Then, as shown in FIG. 8, the meshing of the gear 29a of the intermediate gear 29 and the gear 24a of the first manipulation ring 24 is released and it is meshed with the gear 25a of the second manipulation ring 25 so that the meshing of the gear 29b of the intermediate gear 29 and the motor gear 32 is released. Under this state, as the photographer directly turns the first manipulation ring 24, the cam cylinder 22 is rotated by way of the cam cylinder drive pin 23 and the lens array is driven. At this time, the second manipulation ring 25 is also rotated by way of the intermediate gear 29 by the same speed as the speed of the first manipulation ring 24, and the lower surface 25b of the second manipulation ring 25 which is lubricated by the high torque grease as well as the lower surface 24b of the first manipulation ring 24 slide on the fixed cylinder 1, so that the lens array is driven with the high operation torque.

Figure 9:
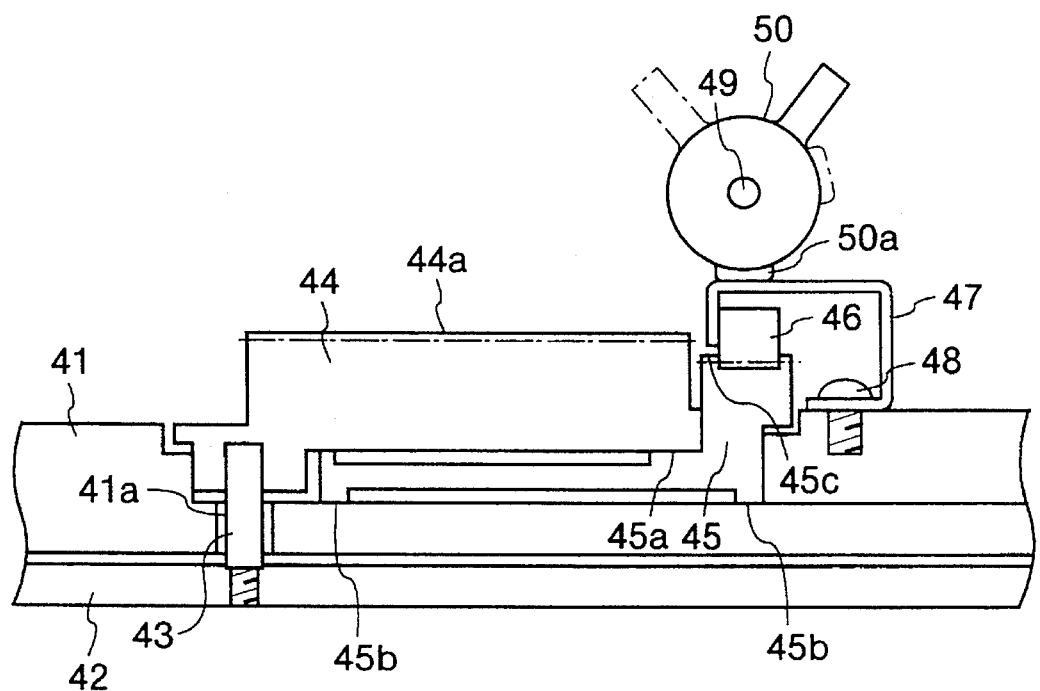
FIG. 9 shows a construction of a third embodiment.

FIG. 9 shows a construction of a third embodiment. A cam cylinder 42 for driving zoom lens array along an optical axis is rotatably mounted within a fixed cylinder 41 of a lens barrel as shown in FIGS. 2A and 2B. One end of a cam cylinder drive pin 43 is fixed so as to project outwardly from a linear groove 41a formed in the fixed cylinder 41, to an outer side of the cam cylinder 42 and an outer end of the cam cylinder drive pin 43 is fitted to a manipulation ring 44 having a gear 44a on an outer periphery. A sliding ring 45 is provided on the right of the manipulation ring 44 to overlap therewith, and an upper sliding surface 45a and a lower sliding surface 45b of the sliding ring 45 are lubricated by grease for the manipulation ring 44 and the fixed cylinder 41, respectively. Further, knurling 45c is formed on the outer periphery of the sliding ring 45.

On the other hand, a leaf spring 47 to upwardly bias a wedge 46 is fixed by fastener 48 and the wedge 46 is engageable with the knurling 45c of the sliding ring 45. A manual/electrical power switching knob 50 rotatably supported by a shaft 49 is provided above the wedge 46. The manual/electrical power switching knob 50 is provided with a projection 50a to press down the leaf spring 47. The manual/electrical power switching knob 50 determines, corresponding to its rotation position, whether or not a drive power of a motor (not shown) in a drive unit is transmitted to the gear 44a of the manipulation ring 44 to switch the manual operation and the electrical power operation.

In the electrical power-drive mode, the manual power switching knob 50 is rotated to the position shown by a broken line in FIG. 9, and the wedge 46 is driven upward by the action of the leaf spring 47 and the meshing with the knurling 45c of the sliding ring 45 is released, so that the sliding ring 45 is free to rotate. At the same time, the drive power of the motor is ready to be transmitted to the manipulation ring 44.

Under this state, when the motor is energized with voltage, the drive power is transmitted to the manipulation ring 44, and as the manipulation ring 44 is rotated, the cam cylinder 42 is also rotated by way of the cam cylinder drive pin 43, so that the lens array is driven by electrical power. At this time, the sliding ring 45 slides on one of the sliding surfaces 45a and 45b which has a lower sliding resistance thereof, so that the lens array is driven with a minimum operation torque.

In the manual operation mode, the manual/electrical power switching knob 50 is rotated to the position shown by a solid line in FIG. 9, so that the projection 50a of the manual/electrical power switching knob 50 presses the leaf spring 47 and the wedge 46 is meshed with the knurling 45c of the sliding ring 45 and the sliding ring 45 is fixed.

Under this state, when the manipulation ring 44 is manually rotated, the cam cylinder 42 is rotated by way of the cam cylinder drive pin 43 and the lens array is driven. At this time, the sliding ring 45 is not rotated and the manipulation ring 44 slides only on the sliding surface 45a of the sliding ring 45. Namely, by lubricating the sliding surface 45a of the sliding ring 45 by higher friction grease than that of the sliding surface 45b, a higher operation torque may be attained in the manual operation than that in the electrical power operation.

In the third embodiment, the construction is simplified because the link of the manipulation rings 44 and 45 is not required in the electrical power drive mode in which the slide occurs on the sliding surface 45b, and a backlash of the manipulation ring 44 can be reduced. Further, since a particular mechanism to change the operation torque is not required for the drive unit and the switching of the operation torque is attained by merely changing the shape of the manual/power switching knob 50, the compatibility with a drive unit having no mechanism such as the present embodiment can be readily kept.

There may be more or less error in the shape of the manual/electrical power switching knob 50 and the distance to the lens barrel but the assembling and the adjustment are easy because the operation is not damaged even if the leaf spring 47 is pressed beyond the position shown in FIG. 9. It is common that the sliding surfaces 45a and 45b of the sliding ring 45 are lubricated by grease or oil but they may be lubricated by solid lubricant such as molybden disulfate, or even the contact of solids such as metals or synthesized resin.

It is common that the magnitudes of the operation resistance of the sliding surfaces 45a and 45b of the sliding ring 45 are different from each other, but the speed characteristics or the temperature characteristics of the operation resistances may be different depending on the application. For example, the sliding surface 45a may be lubricated by grease and the sliding surface 45b may be contacted with solid.

Further, when such a present mechanism is used, the magnitude of the operation torque also can be switched corresponding to the intent of the photographer. In this case, a knob which does not affect the manual/electrical power switching may be used instead of the manual/electrical power switching knob 50.

Figure 10:
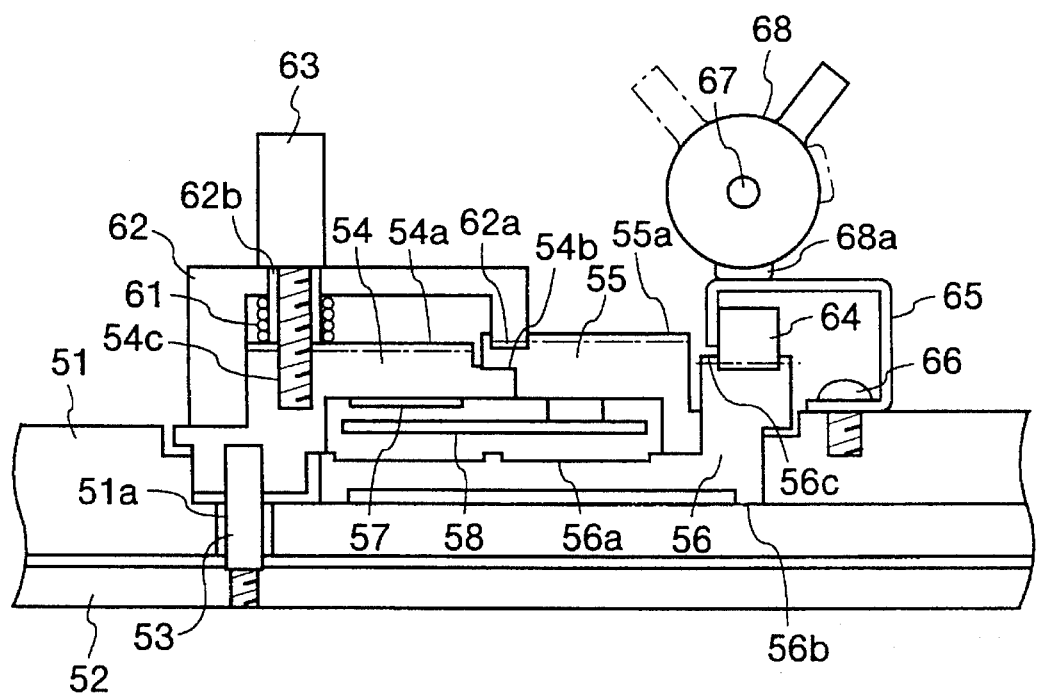
FIG. 10 shows a construction of a fourth embodiment.
Figure 11:
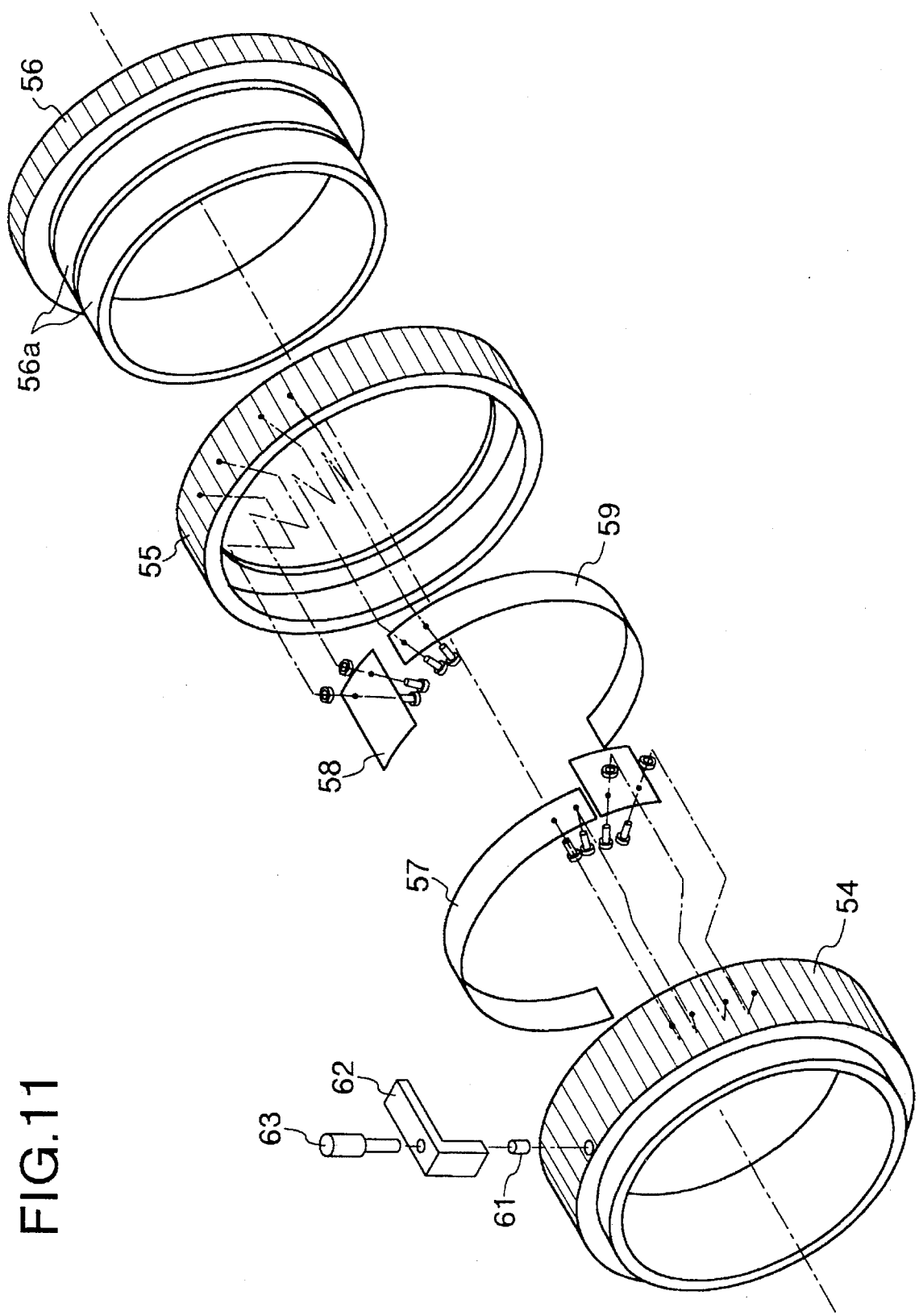
FIG. 11 shows a developed perspective view of the fourth embodiment.

FIGS. 10 and 11 show constructions of a fourth embodiment. FIG. 11 shows a developed perspective view. A cam cylinder 52 for driving lens array along the optical axis is rotatably provided within a fixed cylinder 51 of a lens barrel. An end of a cam cylinder drive pin 53 is fixed so as to project outwardly from a slit 51a formed in the fixed cylinder 51, to an outer periphery of the cam cylinder 52, and an outer end of the cam cylinder drive pin 53 is fitted to a manipulation ring 54 having a gear 54a on an outer periphery thereof.

A manipulation force adjusting ring 55 having knurling 55a on the outer periphery thereof is provided on the right side of the manipulation ring 54 so as to overlap with a circular projection 54b of the manipulation ring 54. A sliding ring 56 is provided within the rings 54 and 55 and an upper sliding surface 56a and a lower sliding surface 56b of the sliding ring 56 are lubricated by grease.

A gap between the manipulation ring 54 and the sliding ring 56 comprises a thin resilient plate, and a friction force generation plate 57 having a substantially flat shape before assembly is wrapped around the sliding ring 56. As shown in FIG. 11, the friction force generation plate 57 has one end thereof fixed to the upper surface of the manipulation ring 54 and the other end contacted to the sliding surface 56a of the sliding ring 56. A contact area adjusting plate 58 for taking the friction force generation plate 57 off from the sliding surface 56a of the sliding ring 56 is provided in the inside surface the operation force adjusting ring 55. By changing a relative angle between the manipulation ring 54 and the operation force adjusting ring 55, the contact area adjusting plate 58 can change the contact area between the friction force generation plate 57 and the sliding ring 56.

Similarly, a friction force generation plate 59 having one end thereof fixed to the inside surface of the operation force adjusting ring 55 is provided in the gap between the operation force adjusting ring 55 and the sliding ring 56 to permit the adjustment of the contact area between the friction force generation plate 59 and the sliding ring 56 by the contact area adjusting plate 60 fixed to the inside surface of the manipulation ring 54.

An operation force fixing member 62 biased upwardly by a spring 61 is attached to the upper portion of the manipulation ring 54, and a wedge 62a formed at an end portion of the operation force fixing member 62 is engageable with a knurling 55a of the operation force adjusting ring 55. An operation force fixing knob 63 passes through a hole 62b formed in the operation force fixing member 62, and the operation force fixing knob 63 is screwed to a female thread 54c formed in the manipulation ring 54.

On the other hand, a leaf spring 65 for biasing the wedge 64 upward is fixed to the fixed cylinder by a fastener 66, and the wedge 64 is engageable with a knurling formed on the outer periphery of the sliding ring 56. A manual/electrical power switching knob 68 rotatably supported by a shaft 67 is provided above the wedge 64 and a projection 68a for pressing down the leaf spring 65 is formed in the manual/ electrical power switching knob 68. The manual/electrical power switching knob 68 has a function to switch the manual and electrical power operations as the manual-power switching knob 50 of the third embodiment does.

In the electrical power drive operation, when the manual/ electrical power switching knob 68 is turned to the position shown by a broken line in FIG. 10, the wedge 64 is driven upwardly by the action of the leaf spring 65 and the meshing with the knurling 56c of the sliding ring 56 is turned off so that the sliding ring 56 is free to rotate. A drive force of a motor, not shown, is ready to be transmitted to the manipulation ring 54.

Under this state, if the motor is energized with voltage, the drive power is transmitted to the manipulation ring 54, and as the manipulation ring 54 is rotated, the cam cylinder 52 is also rotated in way of the cam cylinder drive pin 53 and the lens array is driven by electrical power. At this time, since the sliding ring 56 slides on only any of the sliding surfaces 56a and 56b which has a smaller sliding resistance, the operation with a minimum operation torque is attained.

In the manual operation mode, if the manual/electrical power switching knob 68 is moved to the position shown by a solid line in FIG. 10, the projection 68a of the manual/ electrical power switching knob 68 presses the leaf spring 65, so that the wedge 64 meshes with the knurling 56c of the sliding ring 56. The sliding ring 56 is then fixed. Under this state, if the manipulation ring 54 is manually rotated, the cam cylinder 52 is rotated by way of the cam cylinder drive pin 53, so that the lens array is driven.

At this time, the sliding ring 56 is not rotated and the friction force generation plates 57 and 59 slide on the sliding surface 56a of the sliding ring 56. A sliding resistance is generated in the sliding ring 56 in accordance with the contact area of the friction force generation plates 57 and 59. As a result, an operation torque corresponding to the sliding resistance for the sliding ring 56 is generated in the manipulation ring 54 as the photographer rotates the manipulation ring 54.

In order to adjust the magnitude of the generated operation torque, the operation force fixing knob 63 is released to move the operation force fixing member 62 upwardly by the action of the spring 61, so that the meshing of the wedge 62a of the operation force fixing member 62 and the knurling 55a of the operation force adjusting ring 55 is released and the operation force adjusting ring 55 is free to rotate against the manipulation ring 54. Under this state, when the operation force adjusting ring 55 is rotated clockwise as viewed from the left side along the optical axis in FIG. 11, the portion which moves away from the sliding ring 56 by the contact area adjusting plates 58 and 60 in the friction force generation plates 57 and 59 are wrapped around the sliding ring 56, owing to the sliding resistance generated in the sliding surface 56a of the sliding ring 56, and the area which contacts to the sliding ring 56 in the friction force generation plates 57 and 59 increases.

The operation force fixing knob 63 is again tightened and the manipulation ring 54 is rotated after the wedge 62a of the operation force fixing member 62 is meshed with the knurling 55a of the operation force adjusting ring 55. Then, since the contact area of the friction force generation plates 57 and 59 and the sliding ring 56 is increased, the operation torque of the manipulation ring 54 is also increased. On the other hand, when the operation force adjusting ring 55 is rotated counter-clockwise, the friction force generation plates 57 and 59 are moved away from the sliding ring 56 by the action of the contact area adjusting plates 58 and 60 and the contact area between the friction force generation plates 57 and 59 and the sliding surface 56a of the sliding ring 56 decreases, so that the operation torque of the manipulation ring 54 also decreases.

In the fourth embodiment, the operation torque can be not only switched in two steps in the electrical power mode and the manual mode but also continuously adjusted in accordance with the object to be photographed and the photographing environment, or by the desire of the photographer, etc. It is common to provide a knob on a zooming ring of a television lens in order to provide a visual index of a rotation angle and reduce an operation force required. In a case where the present embodiment is applied to the zooming ring, the operation force fixing knob 63 may be used for the visual index and the reduction of the operation force without providing an additional knob for the visual index.

When the angle relationship between the manipulation ring 54 and the operation force adjusting ring 55 is fixed, the distribution of a stress generated by the fixing is limited to the neighborhood of the wedge 62b of the operation force fixing member 62 because of the pinching of the operation force fixing member 62 by projection 54b of the manipulation ring 54 and the wedge 62b of the operation force fixing member 62. As a result, the circularity of the manipulation ring 54 and the operation force adjusting ring 55 is maintained and smooth operation is attained.

As described above, in the photographing apparatus of the first and second present invention, different torques are used for sliding between the manual operation and the electrical power operation and the drive with a lighter operation torque is attained in the electrical power operation mode without regard to the operation torque in the manual operation mode, so that the photographing is attained with a minimum power consumption and the photographing of a longer time with a battery is permitted. In the manual operation mode, a heavy operation torque may be set independently from the operation torque in the electrical power operation mode and an operation with an optimum touch feeling is attained in accordance with the desire of the photographer, the object to be photographed and the photographing environment. In the manufacturing aspect, the operator is released from delicate torque control required to meet the requirements for both the power operation and the manual operation.

What is claimed is:

1. A lens driving apparatus comprising:

a manipulation ring;

a first sliding surface for rotationally sliding said manipulation ring by a first resistance power;

a second sliding surface for rotationally sliding said manipulation ring by a resistance power lower than the first resistance power; and a lens portion moving in association with a rotational moving operation of said manipulation ring.

2. A lens driving apparatus according to claim 1, further comprising:

driving means for rotationally moving said manipulation ring, wherein said driving means is constituted so that said manipulation ring is rotationally moved by using said second sliding surface in a case where said manipulation ring is rotationally moved by said driving means.

3. A lens driving apparatus according to claim 1, wherein said manipulation ring is rotationally moved by using said first sliding surface in a case where said manipulation ring is rotationally moved by manual operation.

4. A lens driving apparatus according to claim 1, wherein grease is applied to said first sliding surface and said second sliding surface, respectively.

* * * * *

UNITED STATES PATENT AND TRADEMARK OFFICE
CERTIFICATE OF CORRECTION

PATENT NO. : 5,561,564
DATED : October 1, 1996
INVENTOR(S) : TATEKI NAKAMURA, ET AL.

It is certified that error appears in the above-indentified patent and that said Letters Patent is hereby corrected as shown below:

Column 1

Line 24, delete "a".
Line 27, delete "that" and delete "taken".
Line 34, delete "all".

Column 2

Line 8, "sea-saw" should read --see-saw--.
Line 46, "The" (first occurrence) should read --A--; and "a" should read --the--.
Line 66, "photographer" should read --photographer,--.

Column 3

Line 46, "zoom" should read --the zoom--.

Column 4

Line 66, "zoom" should read --the zoom--.

UNITED STATES PATENT AND TRADEMARK OFFICE
CERTIFICATE OF CORRECTION

PATENT NO. : 5,561,564
DATED : October 1, 1996
INVENTOR(S) : TATEKI NAKAMURA, ET AL.

It is certified that error appears in the above-indentified patent and that said Letters Patent is hereby corrected as shown below:

<u>Column 6</u>

Line 28, "lens" should read --the lens--.

<u>Column 7</u>

Line 32, delete "only".
Line 34, delete "the".

<u>Column 8</u>

Line 32, delete "a".

Signed and Sealed this

Fourth Day of March, 1997

Attest:

BRUCE LEHMAN

Attesting Officer                Commissioner of Patents and Trademarks